Sept. 20, 1971 W. D. VOELKER 3,606,171
INJECTION NOZZLE OF ADJUSTABLE LENGTH
Filed March 6, 1970
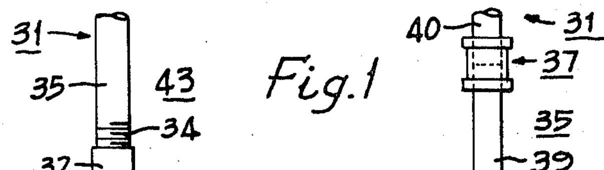
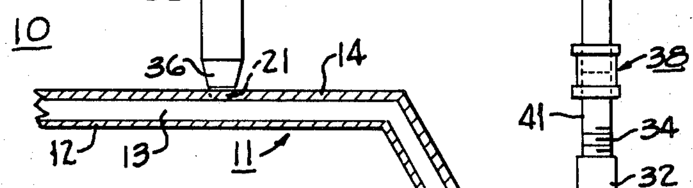
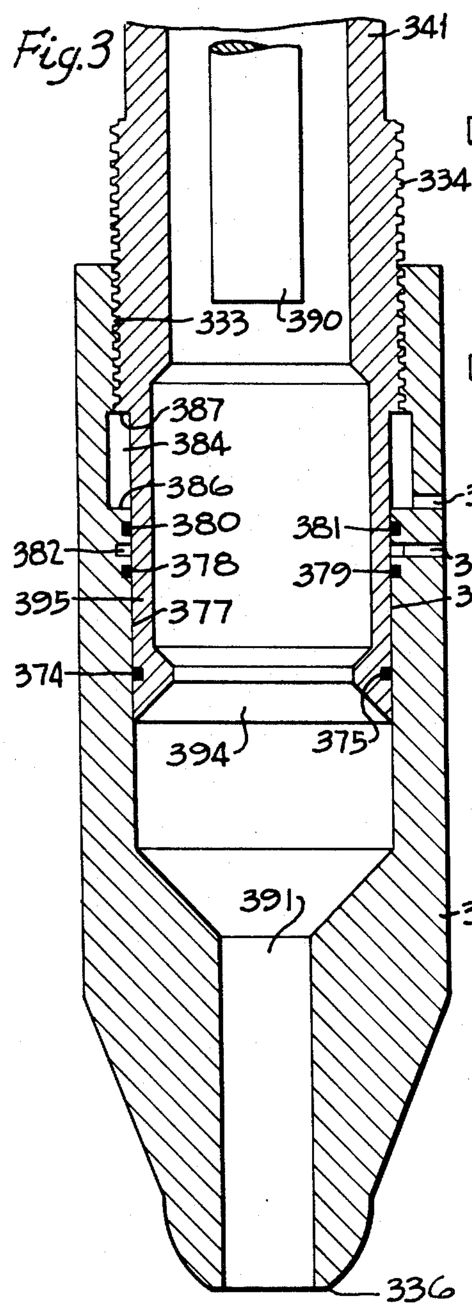
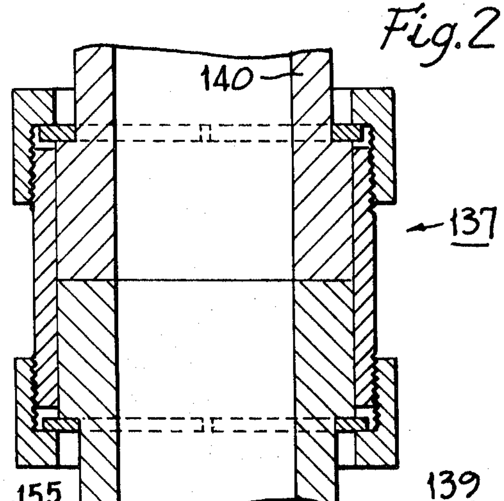
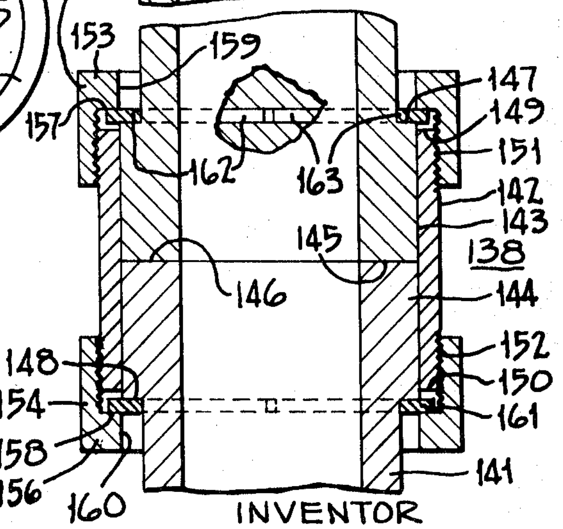
INVENTOR
WALTER D. VOELKER
BY John R. Ewbank
ATTORNEY United States Patent Office 3,606,171
Patented Sept. 20, 1971

3,606,171

INJECTION NOZZLE OF ADJUSTABLE LENGTH

Walter D. Voelker, 220 Miller Road, Philadelphia, Pa. 11801

Filed Mar. 6, 1970, Ser. No. 17,247
Int. Cl. B05b *15/08*
U.S. Cl. 239—587 2 Claims

ABSTRACT OF THE DISCLOSURE

Giant articles are sometimes so shaped that the orifices to be secured to the nozzles of a multi-nozzle injection molding machine should desirably be positioned at different distances from the frame of the molding machine instead of the conventional uniform distance. Threadable adjustable members permit adjustment of length of injection nozzle throughout a range such as one centimeter with a zone of close tolerance sliding contact being locked into non-leaking and non-rotational relationship by the action of relatively high plastic pressure. Such pressure influenced zone, a plurality of O-rings, and weep holes prevent any plastic from seeping to the adjustable threads. Further adjustability is attainable by optionally using extension members which can be inserted and secured by couplers for lengthening a nozzle.

GENERAL BACKGROUND OF INVENTION

Heretofore there have been descriptions of apparatus for the molding of giant articles weighing more than two kilograms by the injection of a molten plastic into a mold through a plurality of nozzles. Systems in which a mixture of gas and molten plastic flow through the pulrality of nozzles have been of particular importance in connection with giant articles, inasmuch as such use of gas permits the molds to be filled and clamped at a pressure lower than required for gas-free compositions. The banks of nozzles have heretofore been designed to be of uniform length, which has been quite satisfactory in the molding of panels and selected shapes. Serious difficulties have been encountered in designing molds for certain articles to match the nozzles of uniform length.

SUMMARY OF INVENTION

In accordance with the present invention, the axial length of an injection nozzle is made adjustable by the provision of threaded members. The leakage of plastic to the threads is prevented by the combination of: a sliding contact close tolerance zone locked into non-rotational and leak free condition by the plasic pressure; weep holes directing the flow of seepage outwardly; and a plurality of properly positioned O-ring gaskets.

The threadable microadjustment may be supplemented by couplings for joining optionally insertable extensions between the fore and hind portions of the tubular portion of the nozzle.

DESCRIPTION OF DRAWINGS

FIG. 1 is a schematic showing of a mold having a plurality of orifices for the receipt of nozzle tips which are not in the same plane.

FIG. 2 is a schematic showing of an extension member and a pair of coupling units.

FIG. 3 is a schematic showing of a nozzle tip the length of which is adjustable by reason of the threaded interengagement between components.

FIGS. 4 and 5 are segments of gaskets.

DESCRIPTION OF EMBODIMENTS

An injection molding system 10 of FIG. 1 includes a mold 11 for a four passenger boat, an example of a giant article weighing more than two kilograms. The mold includes a movable contoured wall 12, a cavity 13, and a fixed contoured wall 14. Such mold differs from most injection molds by reason of the plurality of orifices 21, 22, as well as others not shown. For each mold orifice, there is an injection nozzle, indicated as 31. Although different injection nozzles may be longer or shorter than others, for conservation of numbering, the various parts of the predominantly identical injection nozzles are numbered by a common system. A nozzle 31 can be conveniently described as including a fore member 32 having internal threads engaging with a threaded zone 34 of a tubular portion 35 of the nozzle, whereby the length of the nozzle may be adjusted and a nozzle tip 36 positioned where desired. Couplings 37, 38 secure an extension member 39 between an upper portion 40 and a lower portion 41 of the tubular portion 35 of the nozzle 31.

As shown in FIG. 3, a fore member 332 is adjustably secured to a member 341 of the tubular portion by interengagement between internal threads 333 and external threads 334. Although the drawings show the adjustable threaded zone near the snout of the nozzle, its location along the axis of the nozzle is a matter of engineering convenience. At the time when a new mold is attached to the molding system, while there is no pressure in the nozzle, the length of the nozzle is adjusted by turning the threads so that a nozzle tip 336 satisfactorily fits an orifice of a mold. An O-ring type of a primary gasket 374, positioned in groove 375 near the tip of a tubular finger 394 on member 341, serves as a primary barrier against the seepage of plastic between the slideably engaged surfaces designated as outer surface 376 of the finger 394 and the inner surface 377 of the fore member 332.

Particular attention is directed to the effect of high pressure plastic in forcing a tubular portion 395 of the finger 394 against the enlarged bore 377 of the fore member, whereby the finger is locked so that the threads cannot be rotated. Such locking also makes such joint leakproof during the maintenance of high pressure. The length of a nozzle is adjusted only when fitting a mold onto the molding machine, at which time there is no plastic or plastic pressure in the nozzle whereby rotary adjustment of the threaded connection permits adjustment of the nozzle length. Only a small tolerance is provided between the outer surface 376 of finger 394 and the enlarged bore 377 of the fore member. An appropriate thinness of a tubular portion 395 of finger 394 permits easier transmittal of the pressure for locking and self sealing the sliding fit. Precautions are taken to prevent seepage of plastic to the threads.

An O-ring of a secondary gasket 378 is positioned in groove 379 in the fore member, and an O-ring type of tertiary gasket 380 is held within groove 381 in the fore member. Between the secondary gasket 378 and tertiary gasket 380 is a groove 382 provided with a weep hole 383 permitting the escape of any accumulated waste. A chamber 384 is provided with a weep hole 385 through which air can be discharged when the chamber 384 is reduced to nothing when rim 386 of the fore member is screwed into abutment with end 387 of the threaded zone 334. Thus any plastic seeping past gaskets is diverted to the exterior of the nozzle and is not permitted to contaminate the threads. Heretofore attempts to provide adjustability by threaded connections in lines carrying high pressure plastic have proven unmanageable because of the propensity for the threads to be contaminated with plastic.

A plunger 390 is adapted to be advanced and withdrawn within the nozzle, and to be within bore 391 of the tip 336 during appropriate portions of the molding cycle. The tip 336 can be advanced or withdrawn by making an adjustment of the threaded interengagement between the rotatable fore member and member 341 when there is no pressure in the nozzle.

In FIG. 2, an extension member 139 corresponds generally to the extension member 39 of FIG. 1. Coupling member 137, 138 associate the extension member 139 with a lower portion 141 and an upper portion 140 of the tubular portion of the nozzle.

In the coupling member 138, a sleeve 142 snugly fits upon both a fore shoulder 143 of the extension member 139 and a fore shoulder 144 on said fore portion 141. The shoulder 143 has a cut-off end 145 which abuts against a cut-off end 146 of shoulder 144. Similarly the other ends of the shoulders are designated as a lip end face 147 of the shoulder 143 and a lip end face 148 of shoulder 144. An annular hind end face 149 and annular fore face 150 of the sleeve 142 are not quite aligned with the ends 147 and 148 of the shoulders because the length of the sleeve 142 is slightly less than the sum of the lengths of the two shoulders. By making the sleeve slightly shorter than the sum of the lengths of the shoulders, the tightening pressure is concentrated at the ends 147, 148, of the shoulders where such pressure is beneficial instead of being exerted against the fixed sleeve 142, where such pressure is futile.

A hind threaded portion 151 and a fore threaded portion 152 of the sleeve 142 are interengaged with threaded ferrules 153, 154. Lips 155, 156 include pressure faces 157, 158 and inner cylindrical surfaces 159, 160. In assembling the coupling 138, the ferrule 153 can be slipped over shoulder 143 because the cylindrical surface 159 of the ferrule has a very slightly larger diameter than the diameter of the shoulder 143.

Pressure for holding the coupling together is exerted through segmented gaskets which can be installed and replaced without separating the cut-off ends 145, 146 of the shoulders. Although it is simpler to employ a pair of 180° segments, it would be possible to utilize three 120° segments or other appropriate large segment combinations. The combination of segments providing 360° is designated as gasket 161, and two 180° segments are designated as 162, 163.

In the assembly of the coupling 138, the ferrule 153 is slipped over the shoulder 143, and the ferrule 154 is slipped over the shoulder 144. The sleeve 142 is fitted over the shoulders 143, 144, and because the sleeve is not quite as long as the sum of the lengths of the shoulders, the shoulder ends 147, 148 are not perfectly aligned with the sleeve ends 149, 150. Two 180° segments 161, 162 are assembled as a gasket 160 and positioned on the ends 147, 149 of the shoulder 143 and sleeve 142, and then the ferrule 153 is slid into engagement with the threads 151 on the sleeve. Similarly, a gasket 160 is positioned between the pressure face 158 of the lip 156 of the ferrule 154 and the ends 148, 150 of the shoulder 144 and sleeve 142. Then the ferrules 153, 154 are turned to increase the threaded interengagement, and as the ferrules are tightened, the pressure is applied particularly to the shoulder ends 147, 148 to secure together the extension member 137 and lower portion 141. Various lengths of extension members may be employed to meet the requirements of the mold.

In FIGS. 4 and 5, large angle segments of flat annular segments are shown. When assembled to provide substantially 360° of annular gasket, the combination has a shape corresponding to an annular portion of a sheet, the inner diameter of the annulus corresponding approximately to the outer diameter of the tubular portion of the nozzle and the outer diameter of the annulus corresponding approximately to the inner diameter of the threaded portions of a ferrule. Such gasket members are so positioned as to be engaging with the face of the lip of the ferrule and the end of the sleeve and the end of the shoulder, so that squeezing by the tightening of the ferrule onto the sleeve prevents the two shoulders from having any relative axial movement.

The invention claimed is:

1. In a nozzle for the injection molding of plastic into a mold in which a supply of molten plastic can flow through a bore of a tubular portion of the nozzle from a rearward portion toward the nozzle tip whenever a plunger is adequately withdrawn from the tip of the nozzle, and in which the nozzle tip is secured against an orifice in a fixed portion of a mold, said mold having a plurality of orifices requiring a plurality of nozzles, the improvement which includes the combination of:

a hind member having external threads throughout a predetermined length;

a fore member having internal threads throughout a length significantly different from the length of threaded portion of the hind member, the internal threads of the fore member being interengaged with the external threads of the hind member, and adapted for relative rotation while the plastic pressure within the bore of the fore member is relatively low, said rotation permitting adjustment of the length of the nozzle throughout a predetermined range;

a tubular finger of the hind member fitting within an enlarged bore of the fore member by a close tolerance, said tubular finger providing a length of sliding contact with the enlarged bore of the fore member which is greater than said predetermined range of adjustment of the length of the nozzle;

an O-ring in a slot in the tubular finger near the tip of said tubular finger and adapted to minimize flow of pressurized plastic between the tubular finger and said enlarged bore;

an area hindward of said O-ring provided to allow a zone of the tubular finger to expand against the enlarged bore of the fore member to substantially prevent rotation of the threaded fore member while the plastic pressure within the bore of the fore member is relatively high;

at least one O-ring in a slot in the enlarged bore of the fore member, said O-rings minimizing any seepage of plastic beyond the zone of expansion of the tubular finger;

a chamber between the hindmost O-ring in the enlarged bore of the fore member and the threads of the fore member which chamber can be enlarged and contracted when the length of the nozzle is adjusted;

and at least one weep hole from a zone forward of the threaded portion of the fore member and extending to the exterior of the nozzle whereby any seepage of plastic flows outwardly and is thus diverted from flowing to the threads, whereby the nozzle can be adjusted to any length within said predetermined range of adjustment with out the threads being contaminated by plastic.

2. The nozzle of claim 1 having the combination of:

a hind shoulder having a predetermined length of cylindrical surface of larger diameter than the diameter of the tubular portion of the nozzle, said shoulder ending at a cut-off portion of the tubular portion of the nozzle, and said shoulder having a lip end opposite said cut-off end;

a fore shoulder having the same larger diameter and same predetermined length and beginning at a cut-off portion of the tubular portion of the nozzle, said fore shoulder having a lip end opposite said cut-off end;

an extension member having at each end a shoulder having said larger diameter and predetermined length, the lip ends to the two shoulders being spaced axially from each other, said extension member being optionally insertable between the hind and fore shoulders of the nozzle;

at least one sleeve having an internal diameter adapted to fit over an axially aligned combination of a contiguous pair of shoulders of members of the group consisting of the tubular portion of the nozzle and extension member, the sleeve having a length resembling the length of twice said predetermined shoulder length, there being externally threaded portions at each end of the sleeve;

a plurality of internally threaded ferrules, each ferrule having an internally threaded portion adapted to engage with the externally threaded portions of a sleeve, said ferrule having an unthreaded lip portion having an internal diameter slightly more than the internal diameter of the shoulder;

a plurality of gasket members, each gasket member having a shape corresponding to a large segment of an annular portion of a sheet, the inner diameter of the annular segment corresponding approximately to the outer diameter of the tubular portion of the nozzle and the outer diameter of the annular segment corresponding approximately to the inner diameter of the threaded portion of a ferrule, whereby a combination of gasket members providing essentially 360° of annular gasketing, effectively restrains the two shoulders from relative axial movement by engaging with the lip end of a shoulder, and the pressure face of the lip of ferrule, such restraint being effective when the ferrules are tightened onto the sleeves;

said cut-off tubular portions, shoulder, sleeves, ferrules and gasket members cooperating to permit the nozzle to be assembled with no extension when a short nozzle is suitable and permitting any of several lengths of extension members to be inserted into the nozzle when a long nozzle is suitable.

References Cited

UNITED STATES PATENTS

| | | | |
|---|---|---|---|
| 553,509 | 1/1896 | Burnham | 285—302X |
| 943,904 | 12/1909 | Struer | 285—302X |
| 1,063,996 | 6/1913 | Moore | 285—372X |
| 2,533,097 | 12/1950 | Dale | 285—302 |
| 3,029,093 | 4/1962 | Willis | 285—351X |

FOREIGN PATENTS

| | | | |
|---|---|---|---|
| 455,037 | 2/1950 | Italy | 285—302 |

LLOYD L. KING, Primary Examiner

R. W. THIEME, Assistant Examiner

U.S. Cl. X.R.

18—30NR; 239—DIG. 4; 285—302, 351, 372

UNITED STATES PATENT OFFICE
CERTIFICATE OF CORRECTION

Patent No. 3,606,171 Dated September 20, 1971

Inventor(s) Walter D. Voelker

It is certified that error appears in the above-identified patent and that said Letters Patent are hereby corrected as shown below:

In the heading to the printed specification, lines 3 and 4, "Walter D. Voelker, 220 Miller Road, Philadelphia, Pa. 11801" should read -- Walter D. Voelker, Philadelphia, Pa., Assignor to Bischoff Chemical Corporation, Hicksville, N. Y. --.

Signed and sealed this 10th day of October 1972.

(SEAL)
Attest:

EDWARD M.FLETCHER,JR.
Attesting Officer

ROBERT GOTTSCHALK
Commissioner of Patents